(12) United States Patent
Wirtz et al.

(10) Patent No.: US 8,875,361 B2
(45) Date of Patent: Nov. 4, 2014

(54) REFORMED BATTERY GRIDS

(75) Inventors: John W. Wirtz, Port Huron, MI (US);
John O. Wirtz, Fort Gratiot, MI (US);
Jack E. McLane, Fort Gratiot, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 975 days.

(21) Appl. No.: 12/124,478

(22) Filed: May 21, 2008

(65) Prior Publication Data

US 2009/0291359 A1 Nov. 26, 2009

(51) Int. Cl.
*H01M 4/82* (2006.01)
*H01M 4/73* (2006.01)
*H01M 4/84* (2006.01)
*H01M 10/12* (2006.01)

(52) U.S. Cl.
CPC *H01M 4/73* (2013.01); *H01M 4/84* (2013.01); *H01M 10/12* (2013.01); *Y02E 60/126* (2013.01)
USPC .................. 29/2; 29/2.25; 429/233; 422/560

(58) Field of Classification Search
USPC ................. 29/2, 2.25; 429/233, 241; 422/560
See application file for complete search history.

(56) References Cited

U.S. PATENT DOCUMENTS

| | | | |
|---|---|---|---|
| 3,947,936 A | 4/1976 | Wheadon | |
| 3,959,016 A | 5/1976 | Tsuda | |
| 4,079,911 A | 3/1978 | Wirtz et al. | |
| 4,349,067 A | 9/1982 | Wirtz et al. | |
| 4,443,918 A * | 4/1984 | Morinari et al. | ..................... 29/2 |
| 4,606,383 A | 8/1986 | Yanik | |
| 5,604,058 A | 2/1997 | Wirtz | |
| 6,274,274 B1 | 8/2001 | Schaeffer et al. | |
| 6,279,224 B1 | 8/2001 | Wirtz et al. | |
| 6,895,644 B2 | 5/2005 | Wirtz | |
| 2005/0164091 A1 | 7/2005 | Schaeffer et al. | |

FOREIGN PATENT DOCUMENTS

| | | |
|---|---|---|
| EP | 1073137 A2 | 1/2001 |
| WO | WO 00/35036 | 6/2000 |

* cited by examiner

*Primary Examiner* — Natalia Levkovich
(74) *Attorney, Agent, or Firm* — Reising Ethington P.C.

(57) ABSTRACT

A method of making a grid for a battery plate of a lead-acid battery. A substantially planar web is manufactured to include a plurality of spaced apart and interconnected wire segments, which at least partially define substantially planar surfaces, have a plurality of transverse lands, and interconnect at a plurality of nodes to define a plurality of open spaces between the wire segments. The web is reformed to change the cross-sectional shape of the wire segments. Other aspects may include simultaneously reducing the thickness of at least a portion of the web while reshaping the wire segments, and/or providing controlled surface roughness on at least one of the surfaces of the web to increase surface area of the grid and thereby promote adhesion of an electrochemically active material to the grid.

36 Claims, 9 Drawing Sheets

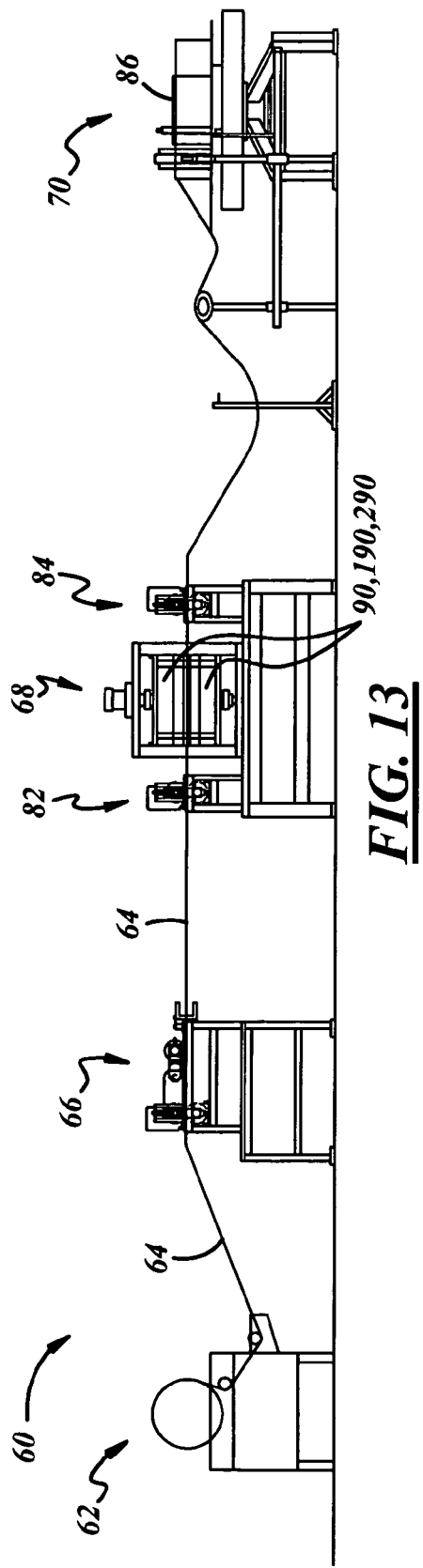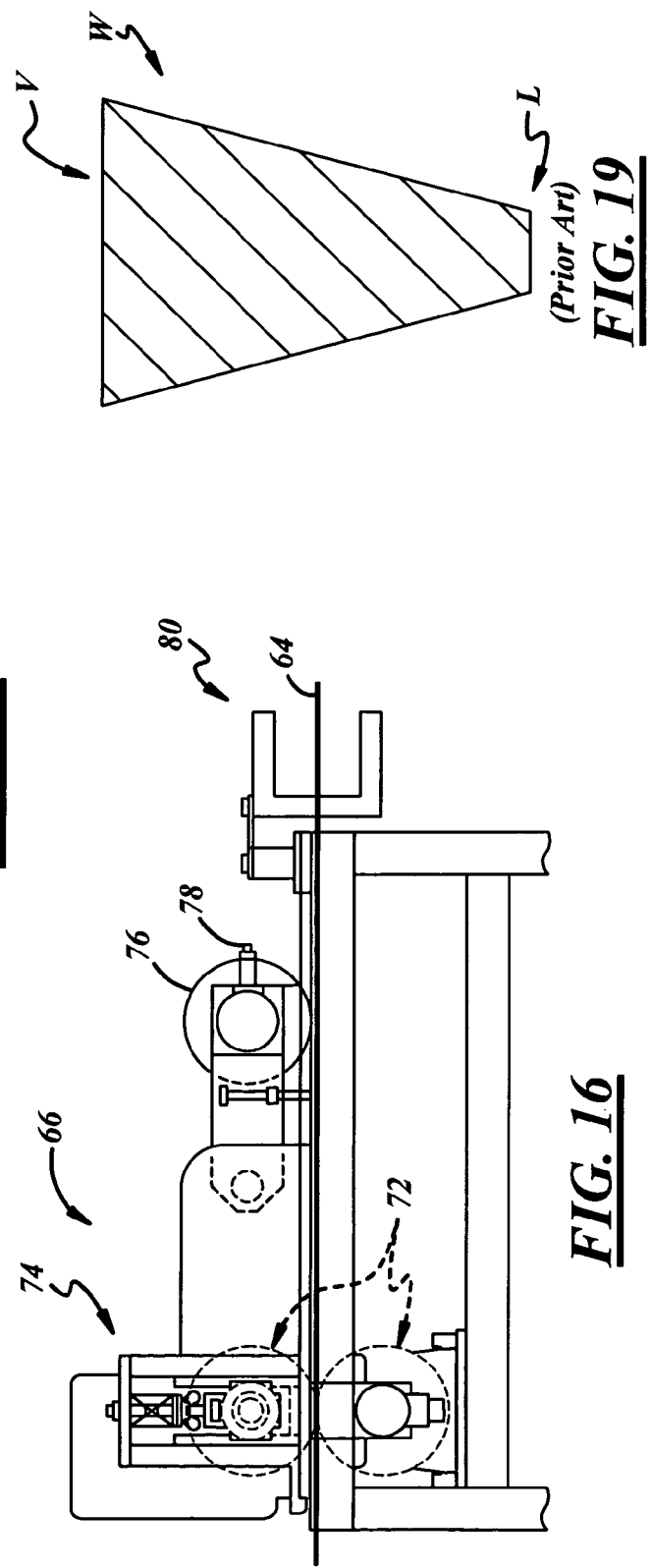

REFORMED BATTERY GRIDS

FIELD OF THE INVENTION

This invention relates generally to lead-acid batteries, and more particularly to grids of battery plates and their method of manufacture.

BACKGROUND OF THE INVENTION

Lead-acid batteries include a plurality of interleaved positive and negative battery plates, each composed of a lead alloy grid and electro-chemically active leaded paste applied to the grid. Lead-acid battery grids have a plurality of spaced apart and transversely extending wires or wire segments to define a reticulated grid having open spaces between the wire segments. The grids are usually "over pasted" so that the wire segments are embedded in and surrounded by the paste, and the paste fills the open spaces between the wire segments. The wire segments of the battery grids are of varying cross-section and are sufficiently spaced apart so that the open spaces between the wire segments comprise a majority of the surface area of the expansive plane of the grids.

Prior continuous grid manufacturing techniques yielded grids having relatively smooth surfaces. For example, battery grids may be manufactured by continuously casting molten lead around a rotating cylindrical drum having a battery grid cavity formed in the drum's outer surface. The molten lead is pressurized and directed to successive segments of the drum's outer surface through an orifice in a fixed shoe, which has a curved surface in close, conforming, and sliding engagement with the drum's outer surface.

Continuous grid casting processes usually produce battery grids having lead wire segments W of generally trapezoidal cross section, as shown in FIG. 19. The trapezoidal wire segments W are generally narrower at their lower ends L in the bottom of the drum cavity and are generally wider at their upper ends V at the drum's outer surface. The differential in width and a difference in temperature between the drum and the relatively hotter shoe causes the cast lead wire segments W to cool faster at the narrower lower ends L and slower at the wider upper ends V. The differential in cooling yields smaller average grain size at the narrower lower ends L and larger average grain size at the wider upper ends V, and sufficient but relatively low tensile strength. While inconsistencies in grain size of the lead and in wire shape may be tolerable for use in negative battery grids, they result in positive battery grids that tend to corrode quickly and have relatively short lives in lead-acid batteries.

SUMMARY OF THE INVENTION

A method according to one implementation includes making a grid for a battery plate of a lead-acid battery. A substantially planar web is manufactured to include a plurality of spaced apart and interconnected wire segments, which at least partially define substantially planar surfaces, have a plurality of transverse lands, and interconnect at a plurality of nodes to define a plurality of open spaces between the wire segments. The web is reformed to change the cross-sectional shape of the wire segments.

The method may also include one or more of the following aspects. The web reforming may also include simultaneously reducing the thickness of at least a portion of the web while changing the cross-sectional shape of at least some of the wire segments. Controlled surface roughness may be provided on at least one of the surfaces of the web to increase surface area of the grid and thereby promote adhesion of an electrochemically active material to the grid. The controlled surface roughness may be about 100 microinches to about 900 microinches Ra, and may be provided on planar surfaces and/or transverse lands of the web. Also, the web manufacturing may include initially forming the web by casting molten lead in a continuous casting mold, wherein the continuous casting mold is surface textured to provide the controlled surface roughness. Further, the web manufacturing may include finish forming the web using a reforming die having surface texturing to provide the controlled surface roughness. Additionally, the controlled surface roughness may be provided by spraying the web, such as by shot blasting or plasma processing.

At least some of the objects, features and advantages that may be achieved by at least certain forms of the invention include providing a battery plate for a lead-acid battery that improves the tensile strength and rigidity of a grid, provides improved grain structure of the grid material, improves adhesion of paste to the grid, has improved resistance to corrosion and grid growth, improves the performance of battery plates, improves the durability and reliability of batteries incorporating the grids, can be manufactured with limited additional cost, can be manufactured with limited additional material of the grid framework, is of relatively simple design, economical manufacture and assembly, rugged, durable, reliable, and in service has a long useful life.

Of course, other objects, features and advantages will be apparent in view of this disclosure to those skilled in the art. Various other battery grids embodying the invention may achieve more or less than the noted objects, features or advantages.

BRIEF DESCRIPTION OF THE DRAWINGS

These and other objects, features and advantages of the present invention will be apparent from the following detailed description of exemplary embodiments and best mode, appended claims, and accompanying drawings in which:

FIG. 3A is an enlarged view of a portion of the battery grid of FIG. 3 showing surface texturing;

FIG. 3B is an enlarged view of a portion of the battery grid of FIG. 3 showing surface texturing;

FIG. 4A is an enlarged view of a portion of the battery grid of FIG. 4 showing surface texturing;

FIG. 4B is an enlarged view of a portion of the battery grid of FIG. 4 showing surface texturing;

FIG. 13 illustrates exemplary continuous casting and reforming process equipment for producing battery grids;

FIG. 16 illustrates an exemplary battery grid strip driving machine of the equipment of FIG. 13;

FIG. 19 illustrates a cross-sectional view of an exemplary prior art battery grid wire segment from a continuous casting process.

DETAILED DESCRIPTION

Figure 1:
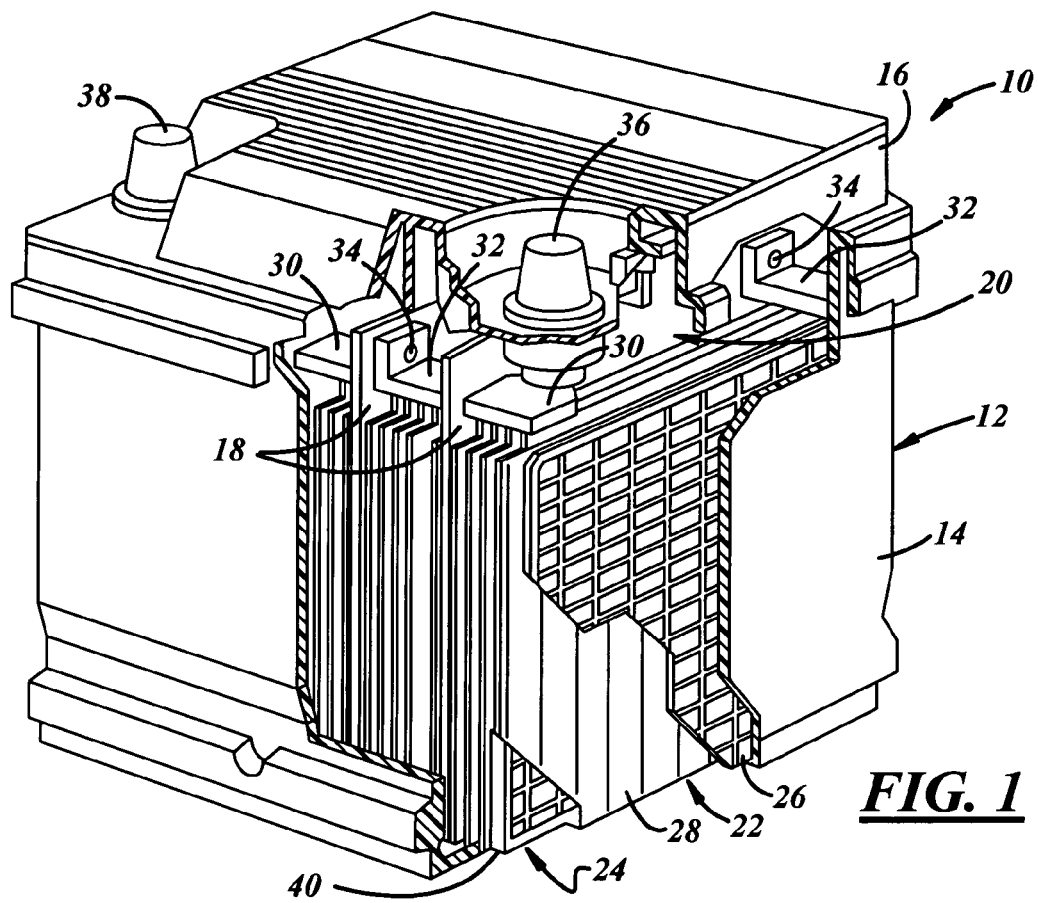
FIG. 1 is a perspective view of a lead-acid battery with a portion broken away and in section.

Referring in more detail to the drawings, FIG. 1 illustrates a lead-acid battery 10 with a housing 12 having a case 14 and a top cover 16 both constructed from a plastic material such as polypropylene. The case 14 has a plurality of integrally molded battery cell dividers 18 forming a plurality of battery cell wells 20 within the housing 12.

A battery cell 22 is disposed within each of the wells 20 between the dividers 18 and has a set or book of interleaved positive plates 24 and negative plates 26, and a separator 28 disposed between each plate of different polarity to prevent them from touching and producing a short circuit within the cell 22. A positive plate strap 30 of lead and a negative plate strap 32 of lead electrically connect together the associated positive and negative plates 24, 26 of each cell 22 across the top of the plates.

To connect the individual cells 22 together in series, an intercell connector 34 of lead is disposed between and welded to the positive plate strap 30 and adjoining negative plate strap 32 of adjoining cells 22 in series. A positive terminal post 36 of lead is connected to the positive plate strap 30 of the first cell and a negative terminal post 38 of lead is connected to the negative plate strap 32 of the last cell. Each post 36, 38 projects through the cover 16 and is sealed to the cover and welded to its associated strap 30, 32. A dilute sulfuric acid solution fills the majority of the remaining space within each well 20 and is the electrolyte for chemical reactions which take place within each battery cell 22.

Figure 3:
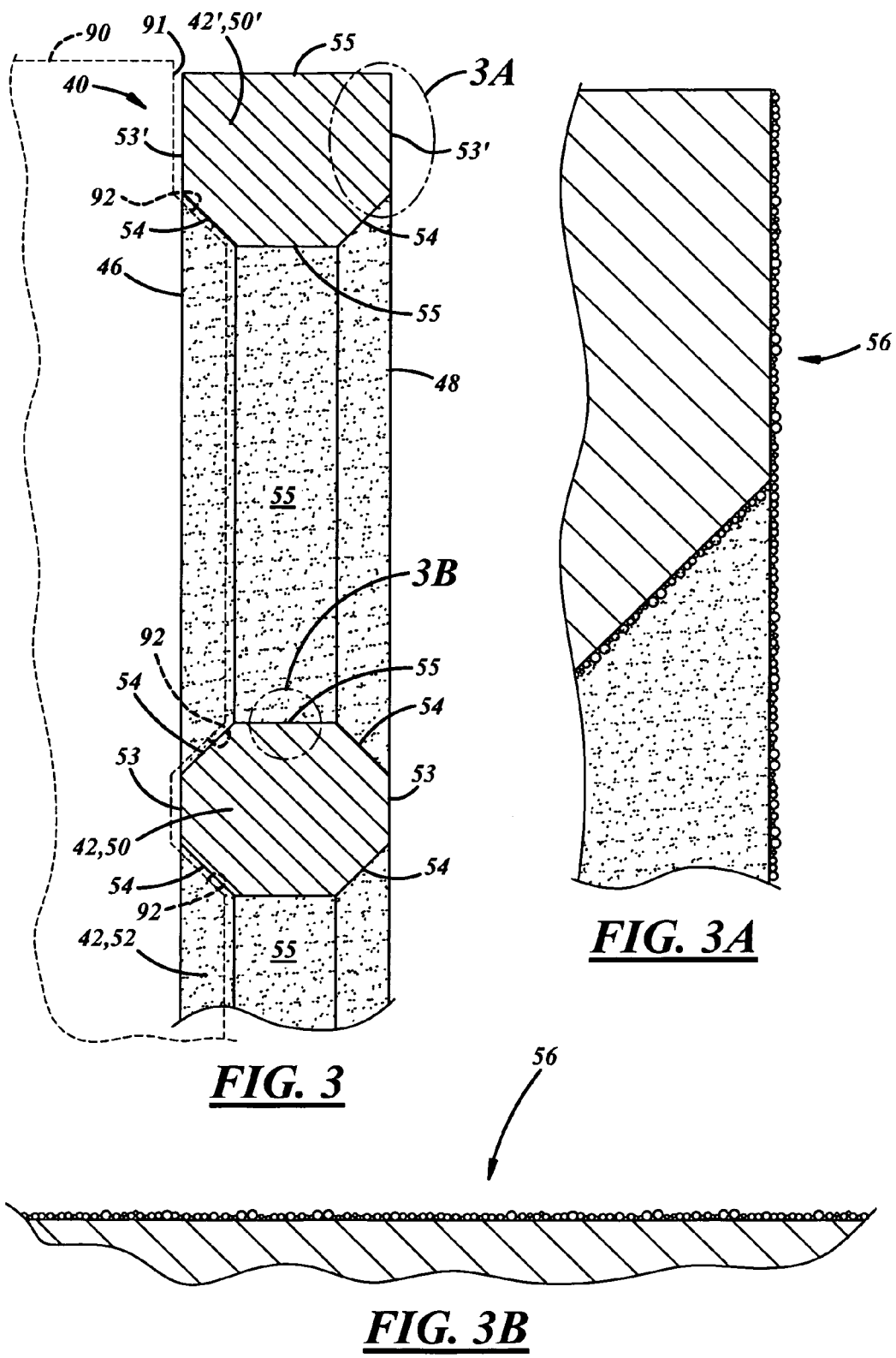
FIG. 3 is a fragmentary sectional view of the battery grid taken generally along line 3-3 in FIG. 2 and showing a first exemplary form of surface texturing.

As noted above, each set or book of battery plates 24, 26 preferably includes a plurality of positive plates 24 and a plurality of negative plates 26. Each of the positive and negative plates 24, 26 includes a battery grid 40 covered and preferably embedded in an electrochemically active material that is usually applied to the grids 40 in the form of a paste. Each grid 40 may include a substantially planar web including a frame 42' and a plurality of lead wire segments 42 that may be encompassed by the frame 42' with at least some of the wire segments 42 intersecting each other at nodes 43 and defining open spaces 44 between adjacent wire segments 42. The grids 40 are preferably generally flat and planar, and have a first substantially planar surface 46 and an opposed substantially planar surface 48 (FIG. 3). The battery grid 40 may be of any suitable composition, for example lead, calcium, tin, and silver.

Figure 2:
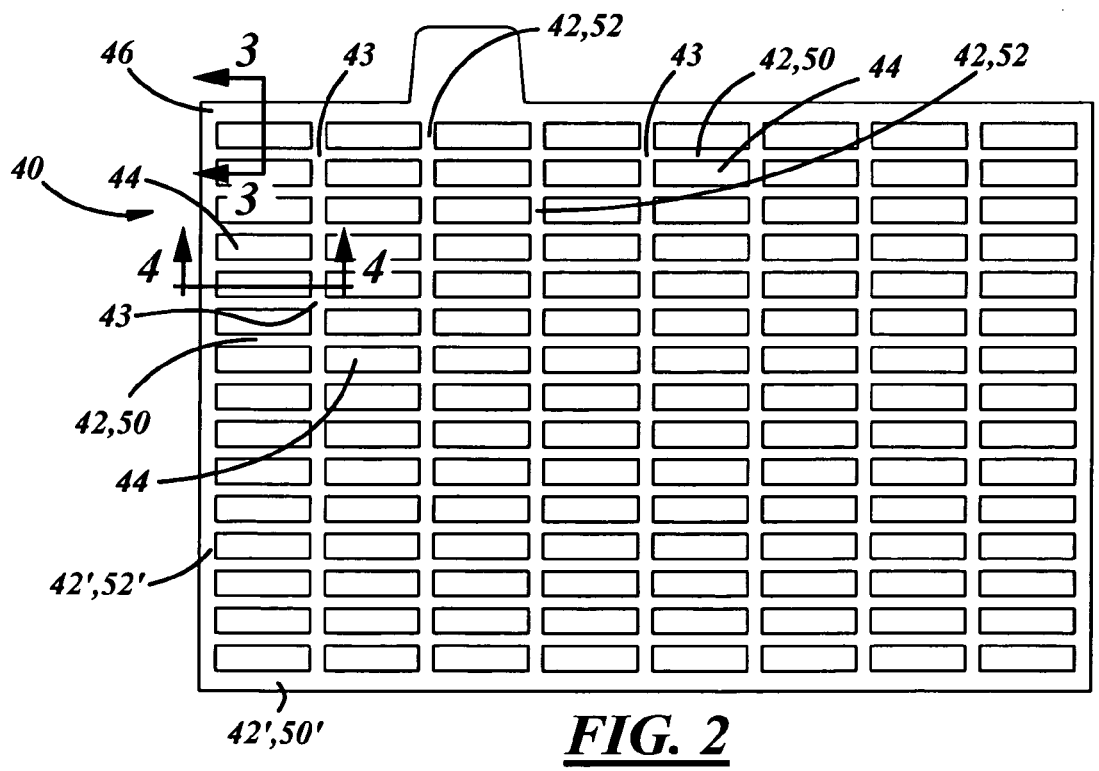
FIG. 2 is a plan view of one exemplary form of a reshaped and textured battery grid used in a lead-acid battery.

In an exemplary form of the battery grid 40 shown in FIG. 2, the wire segments 42 may be defined by a plurality of generally horizontal or longitudinally extending lead wire segments 50, and a plurality of generally vertical lead wire segments 52 intersecting and joined with the horizontal wire segments 50. Similarly, the frame 42 may be defined by generally horizontal or longitudinally extending frame segments 50' and generally vertical frame segments 52'. The horizontal wire segments 50 are spaced apart from each other, and the vertical wire segments 52 are likewise spaced apart from each other defining a generally reticulated framework.

Figure 4:
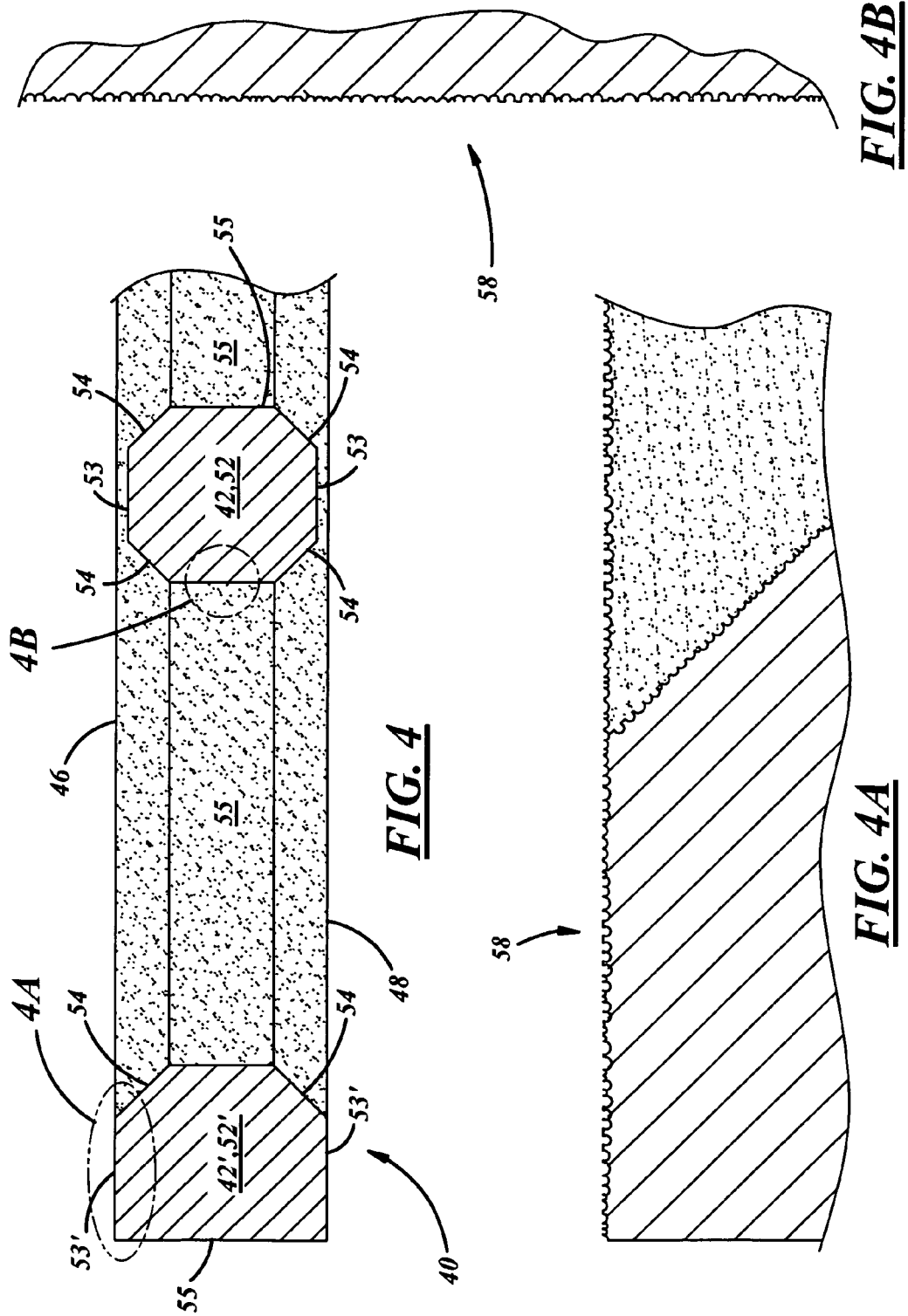
FIG. 4 is a fragmentary sectional view of the battery grid taken generally along line 4-4 in FIG. 2 and showing another exemplary form of surface texturing.

The wire segments 50, 52 and frame segments 50', 52' may be of any desired shape, orientation, spacing, and the like. For example, the vertical wire segments 52 may instead zigzag so they are not perpendicular to the horizontal wire segments 50 such that the open spaces 44 are parallelograms. As a further example, any of the horizontal or vertical wire segments 50, 52 can be angled or curved, and the open spaces 44 may have any shape. Also, the wire segments 42 may define planar surfaces that are substantially parallel and flush with respect to corresponding planar surfaces of the frame segments 42' to define coplanar surfaces 46, 48 on opposite sides of the grid 40, as illustrated in FIG. 3. Instead, the wire segments 42 may define planar surfaces that are recessed from corresponding planar surfaces of the frame segments 42', as illustrated in FIG. 4.

The grid 40 may be manufactured by various processes including, by way of example and without limitation, continuous casting of a grid strip and then rolling the grid strip, or continuous casting of a solid strip and then rolling the solid strip followed either by a punching operation or a piercing and pulling operation to define a grid. Exemplary grid and plate manufacturing processes and tooling are disclosed in U.S. Pat. Nos. 6,895,644, 4,606,383, 4,349,067, and 4,079,911 of the assignee hereof, the disclosures of all of which are incorporated herein by reference in their entireties.

To improve adhesion between the grid 40 and the active material paste, the grid 40 may be reformed and controlled surface texturing may be provided on one or more of the surfaces of the grid according to a desired surface roughness before the paste is applied. The controlled surface texturing may be provided according to a substantially uniform size and distribution over the grid and not according to random size and distribution. As used herein, the term adhesion includes the tendency for matter to cling to other matter, due to mechanical, chemical, and/or intermolecular forces. As used herein, the terminology surface roughness includes the relatively closely-spaced or small-scale unevenness of a surface, in contrast to relatively larger-scale variations or "waviness" that may be part of the geometry of the surface. Surface roughness may include a measure of pits and projections that may be measured by, for example, a profilometer or the like.

Exemplary surface roughness parameters may include Ra (Roughness Average, i.e. absolute value of surface height averaged over the surface), Rq (Root Mean Square (RMS) Roughness), Rv (Maximum Profile Valley Depth), Rp (Maximum Profile Peak Height), Rt or Rmax (Maximum Peak to Valley Height of the Profile, Rv+Rp), Sm (Mean Peak Spacing), or the like. Exemplary surface roughness value ranges may include about 100 microinches to about 900 microinches Ra and, more particularly about 200 microinches to about 600 microinches Ra, for desired paste adhesion. Additionally, the grids may include a variety of different sizes, distribution, and types of surface roughness for better adhesion of paste thereto.

The surface roughness may be provided in any suitable manner. In a first example, the surface roughness may be applied indirectly to a grid via tooling used to initially form the grid such as a continuous casting mold. In a second example, the surface roughness may be applied indirectly to a grid via tooling that also may be used to finish form the grid including any reforming tooling downstream of a continuous casting mold, such as rolling or stamping dies. In a third example, the surface roughness may be applied directly to a grid, such as by shot blasting or material deposition, after the grid has been formed.

Surface roughness on grids may be created by surface texturing applied to continuous casting molds. For instance, such molds may be subjected to material removal or material additive processes to provide the surface texturing to produce controlled surface roughness on the grids.

Any suitable material removal processes may be used and may include, for example, metal cutting, electrochemical machining, electron-beam machining, laser-beam machining, plasma-beam machining, photochemical etching, and, preferably, electro-discharge-machining (EDM). EDM is a metal-removal process by which materials that conduct electricity can be removed by an electric spark, which is a transient electric discharge through a space between a cathodic tool and an anodic workpiece. In addition, the material removal process may include shot blasting or peening, wherein surfaces of a continuous casting mold can be roughened by bombarding the surfaces with any suitable type of shot. The shot may include any suitable material, such as lead oxide (PbO2), sand, small metal or glass balls, granules of silicon carbide, or the like.

Any suitable material additive processes may be used and may include, for example, electro-deposition of metallic materials to alter existing surface properties of a workpiece, chemical vapor deposition, physical vapor deposition such as evaporation or sputtering deposition.

Surface roughness on grids may be created by surface texturing applied to any suitable tooling used downstream of a casting operation. For example, surface texturing may be applied to one or more stamping or punching dies or tools. Surface texturing may be applied to such tooling using any of the aforementioned metal removal or metal deposition techniques described above with respect to the continuous casting molds. In either case, stamping dies additionally may be designed and manufactured to produce wire segments having angled transverse lands, as shown in FIGS. 3 through 11.

The grids themselves may be shot blasted to provide the surface roughness. In one example, the grids may be shot blasted according to any material removing or deforming process. More particularly, the grids may be shot blasted by shot blasting or peening after the grid is formed but before the paste is applied. As an example, any suitable shot blasting equipment may be used to provide the controlled surface roughness on any of the grid surfaces with any suitable particles, such as particles composed of lead oxide (PbO2), silica or sand, small metal or glass balls, granules of silicon carbide, or the like. In another example, the grids may be sprayed according to any material deposition process. More particularly, the grids may be processed according to plasma processing technology.

Referring now to FIGS. 3 through 4B, in addition to the wire segments 42, the grid 40 includes the generally opposed planar surfaces 46, 48 and any of a number of angled transverse lands 54 therebetween. The wire segments 42 may also be at least partially defined by the planar surfaces 53 and transverse lands 55. FIGS. 3 through 4B also illustrate use of a reforming die 90 on the grid 40. The reforming die 90 may be used to reform at least portions of the grid 40 or web to simultaneously reduce the thickness of at least portions of the grid 40 or web and change the cross-sectional shape of at least some of the wire segments 42.

More specifically, the reforming die 90 may include angled surfaces 92 to form the angled transverse lands 54 on the wire segments 42. As one example, the reforming die 90 may produce a generally octagonal transverse cross-sectional shape of the wire segments 42 including substantially opposed angled transverse lands 54. The reforming die 90 may also include flat surfaces 91 to form flat surfaces elsewhere on the grid 40 such as at the nodes 43 (FIG. 2), the lug, and/or the frame portion around the wire segment network. Accordingly, the entire grid 40 or portions thereof may be cold worked by reductions in thickness. Of course, opposed reforming dies 90 may be used on opposite sides of the grid 24 to produce the substantially opposed planar surfaces 53 and transverse lands 54, 55.

For example, the continuous cast grid wire segment W shown in FIG. 19 may be reformed, in an enclosed die under pressure, from its as-cast keystone shape (in transverse cross-section) to any of the wire segment sectional shapes shown in FIGS. 3 through 12. In another example, the grid 40 may instead be punched or pierced-and-pulled according to an expanded metal process and then reformed to any of the shapes shown in FIGS. 3 through 12.

In other words, any suitable forming or reforming tooling may include angled surfaces corresponding to the desired angled surfaces of the grid 40. In contrast to conventional straight-sided wire segments, the angled shape of these wire segments 42 provides increased surface area exposed to the open spaces of the grid 40 for better adhesion of the paste, and better resistance to any tendency of paste to fall out of the open spaces. As used herein, forming processes include stamping and rolling processes, and forming or reforming tooling include stamping and rolling dies. Also as used herein, stamping processes include punching processes, and stamping dies include punching dies.

The exemplary reforming die 90 may include the flat surfaces 91 and the angled surfaces 92 with surface texturing to provide controlled surface roughness on the grid 40. Accordingly, the planar surfaces 46, 48 and/or the transverse lands 54 may be provided with the controlled surface roughness. As shown in FIGS. 3A and 3B, the surface roughness may be provided as projections 56. In contrast, FIGS. 4 through 4B illustrate an alternative configuration wherein the surface roughness is provided as pits or indentations 58. In another alternative configuration, the surface roughness may be provided as a combination of pits and projections.

Figure 5:
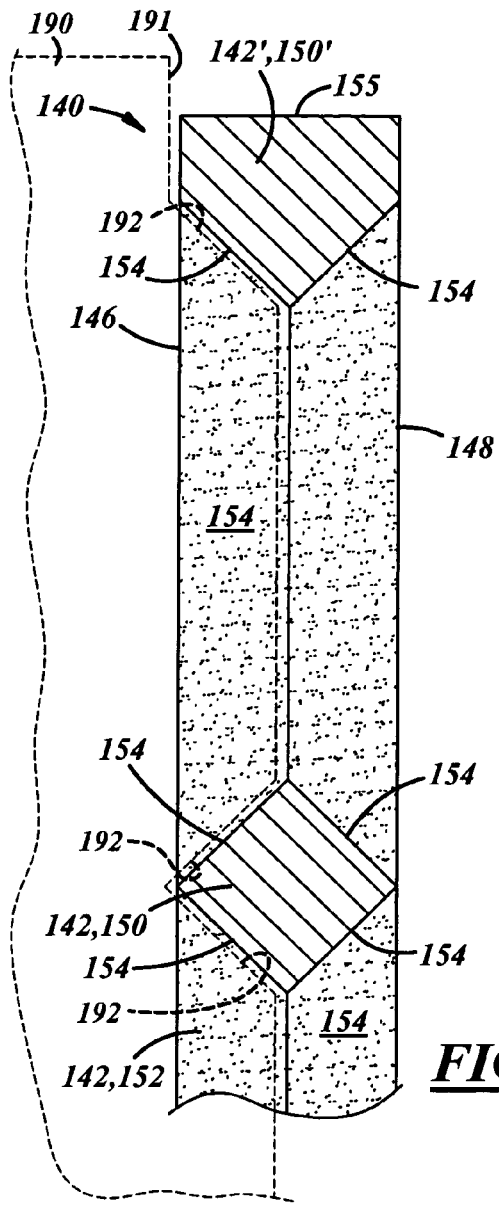
FIGS. 5 and 6 are fragmentary sectional views of a third exemplary form of surface texturing and reshaping of a battery grid.
Figure 6:
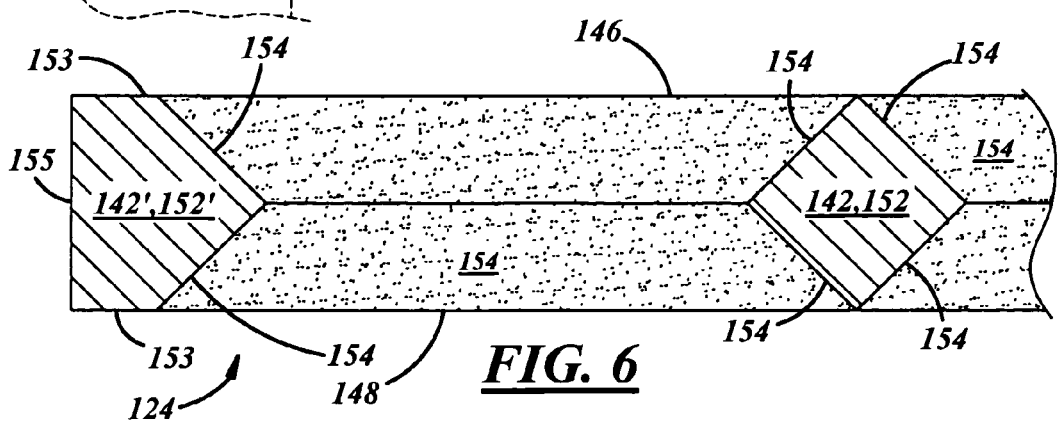

FIGS. 5 and 6 illustrate another exemplary form of a grid 140 and use of a reforming die 190 having flat surfaces 191 and angled surfaces 192. The reforming die 190 may be surface textured such that the flat surfaces 191 may provide controlled surface roughness on planar surfaces 146, 148, of a grid 140, and such that the angled surfaces 192 may provide controlled surface roughness on angled transverse lands 154 of wire segments 142 of the grid 140. The angled surfaces 192 may also define the shape of the angled transverse lands 154 to produce a generally diamond shape in transverse cross section. The wire segments 142 may also be at least partially defined by planar surfaces 153 and transverse lands 155.

Figure 7:
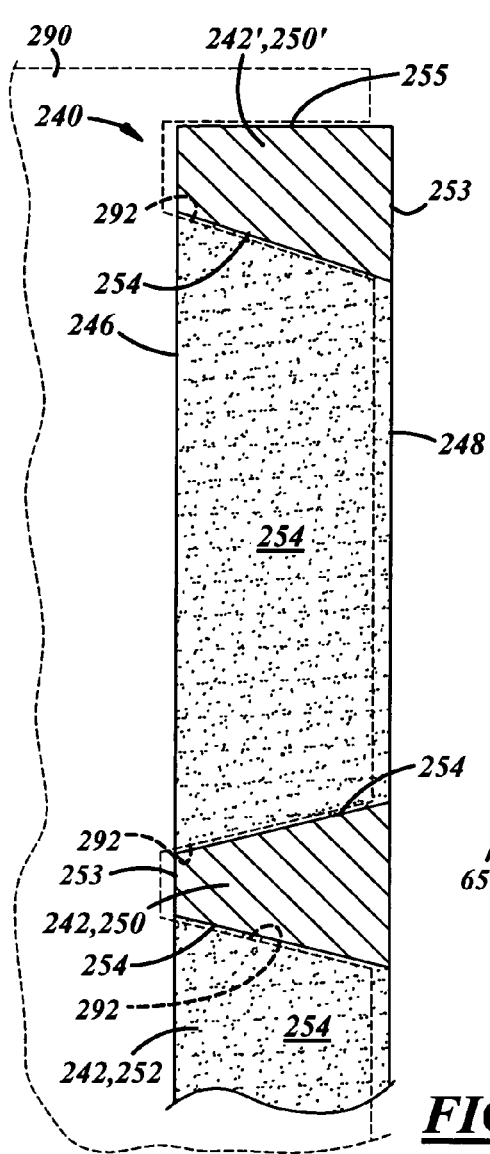
FIGS. 7 and 8 are fragmentary sectional views of a fourth exemplary form of surface texturing and reshaping of a battery grid.
Figure 8:
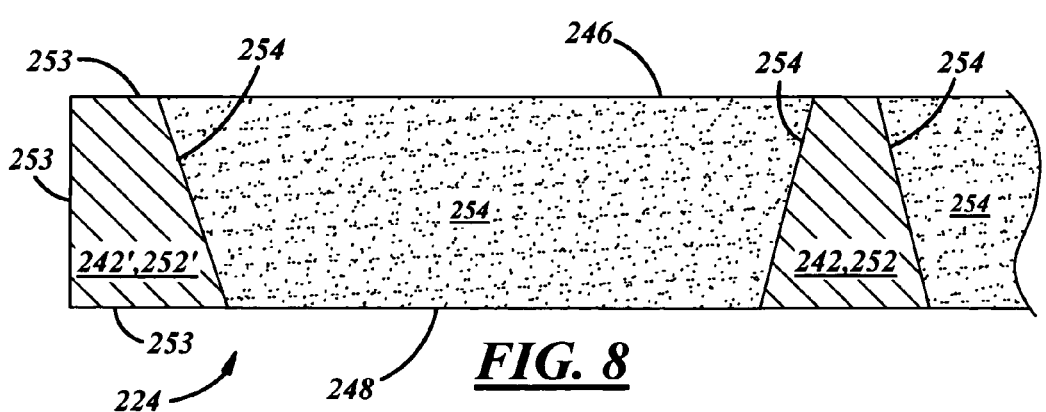

FIGS. 7 and 8 illustrate another exemplary form of a grid 240, which may be continuously cast and further processed by a reforming die 290 having flat surfaces and angled surfaces 292. In contrast to the forms of FIGS. 3 through 6, here the reforming die 290 may not significantly reform the geometry of the as-cast wire segments. But, the reforming die 290 preferably reduces the thickness in accordance with the teachings herein. The reforming die 290 may be surface textured such that the flat surfaces may provide controlled surface roughness on planar surfaces 246, 248 of a grid 240, and such that the angled surfaces 292 may provide controlled surface roughness on angled transverse lands 254 of wire segments 242 of the grid 240. The angled surfaces 292 may also generally conform to or slightly refine the shape of the angled transverse lands 254 to produce a generally trapezoidal shape in transverse cross section. The wire segments 242 may also be at least partially defined by planar surfaces 253 and transverse lands 255.

Figure 9:
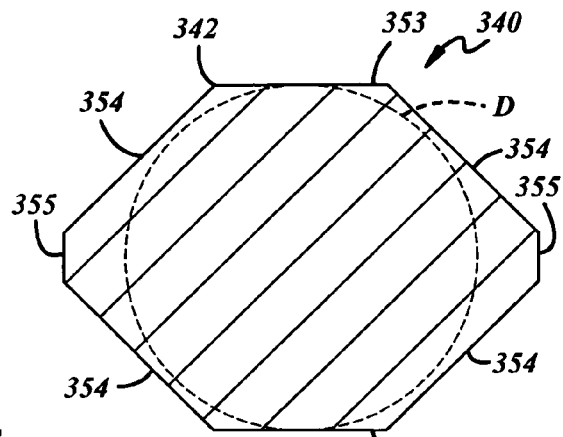
FIGS. 9 through 12 illustrate cross sections of several different exemplary battery grid wire segments.

FIG. 9 illustrates another exemplary form of a portion of a grid 340 having wire segments 342 of a particularly preferred cross-sectional shape, size, and dimensional proportions. Those of ordinary skill in the art will recognize that the dimensional proportions may be calculated from the exemplary sizes described below. An exemplary overall width of each wire segment 342 may be about 0.045-0.050 inches and an exemplary overall height may be about 0.025-0.045 inches. More particularly, the exemplary width and height may be about 0.047 inches and about 0.035 inches respectively. An exemplary width of planar surfaces 353 may be about 0.015-0.020 inches, and an exemplary height of transverse lands 355 may be about 0.003-0.007 inches. More specifically, the exemplary width and height of the lands may be about 0.017 inches and 0.050 inches respectively. Exemplary widths and heights of angled transverse lands 354 may be about 0.015 inches. An exemplary cross-sectional surface area of the wire segments 342 may be about 0.0009-0.0016 square inches and, more specifically, about 0.001200 square inches. Also, the segments 342 may envelop a thickness and common wire diameter D of between about 0.025-0.045 inches and, more particularly, about 0.035 inches.

Figure 10:
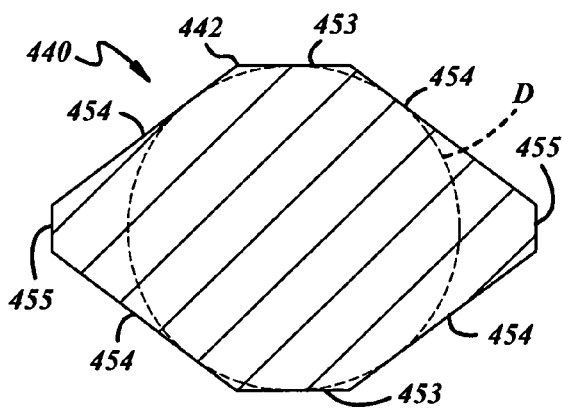

FIG. 10 illustrates another exemplary form of a portion of a grid 440 having a wire segment 442 of a particularly preferred cross-sectional shape, size, and dimensional proportions. An exemplary overall width of each segment 442 may be about 0.048-0.054 inches and an exemplary overall height may be about 0.025-0.045 inches. More particularly, the exemplary width and height may be about 0.051 inches and about 0.035 inches respectively. An exemplary width of planar surfaces 453 may be about 0.010-0.014 inches, and an exemplary height of transverse lands 455 may be about 0.003-0.007 inches. More specifically, the exemplary width and height of the lands may be about 0.012 inches and 0.050 inches respectively. Exemplary widths and heights of angled transverse lands 454 may be about 0.015-0.020 inches. An exemplary cross-sectional surface area of the wire segments 442 may be about 0.0009-0.0016 square inches and, more specifically, about 0.001200 square inches. Also, the segment 442 may have a thickness and envelop a common wire diameter D of between about 0.025-0.045 inches and, more particularly, about 0.035 inches.

Figure 11:
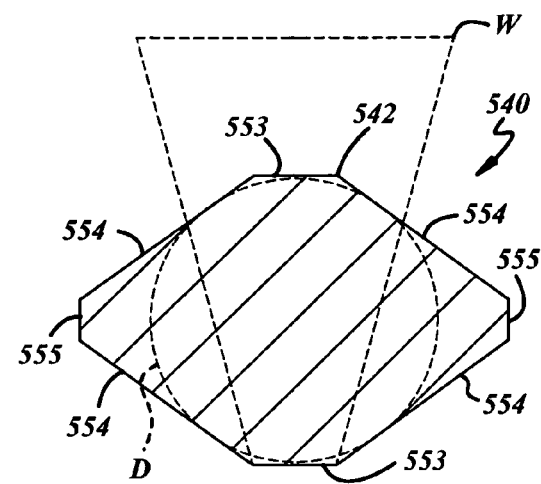

FIG. 11 illustrates another exemplary form of a portion of a grid 540 having a wire segment 542 of a particularly preferred cross-sectional shape, size, and dimensional proportions. FIG. 11 also illustrates in phantom lines a raw wire segment W, which may be as-cast and reformed into the shape of the finished wire segment 542. The raw wire segment W may be trapezoidal in cross-sectional shape with an overall thickness or height of about 0.051 inches and an overall width of about 0.038 inches for a cross-sectional area of about 0.001224 square inches. An exemplary overall width of the reformed segment 542 may be about 0.048-0.054 inches and an exemplary overall height may be about 0.025-0.045 inches. More particularly, the exemplary width and height may be about 0.051 inches and about 0.035 inches respectively. An exemplary width of planar surfaces 553 of the segment 542 may be about 0.008-0.012 inches, and an exemplary height of transverse lands 555 of the segment 542 may be about 0.003-0.007 inches. More specifically, the exemplary width and height of the lands may be about 0.010 inches and 0.050 inches respectively. Exemplary widths and heights of angled transverse lands 554 may be about 0.015-0.021 inches. An exemplary cross-sectional surface area of the wire segment 542 may be about 0.0009-0.0016 square inches and, more specifically, about 0.001225 square inches. Also, the segment 542 may have a thickness and envelop a common wire diameter of between about 0.025-0.045 inches and, more particularly, about 0.0342 inches.

Figure 12:
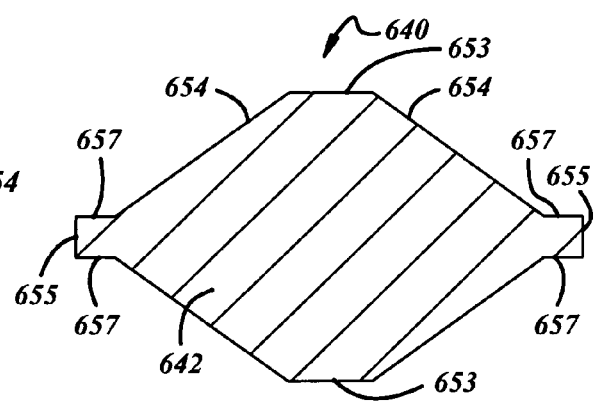

FIG. 12 illustrates another exemplary form of a portion of a grid 640 having a wire segment 642 of a particularly preferred cross-sectional shape that is substantially similar to the wire segment 542 of FIG. 11. This wire segment 642, however, also includes planar lands 657 extending between transverse lands 655 and angled transverse lands 654. The planar lands 657 may be beneficial in providing additional surface area to retain electrochemical paste.

FIG. 13 illustrates a layout of an exemplary continuous battery grid production system 60. The system 60 includes a continuous casting machine 62 to continuously cast a strip 64 of battery grids, a strip driving machine 66 to receive the as-cast strip 64 from the upstream casting machine 62, stretch the as-cast strip 64, and convey the as-cast strip 64 downstream. As the strip 64 of battery grids is continuously cast from the casting machine 62, the strip driving machine 66 may pull the strip 64 through a water quench tank of the casting machine 62. The system 60 also includes a continuous grid reforming machine 68 to receive the strip 64 from the upstream driving machine 66 and reform grids of the strip 64, and a strip take-up machine 70 to receive a now reformed grid strip 65 from the reforming machine 68. The system 60 may further include any other suitable equipment and processes upstream, downstream, or in between the aforementioned machines.

Figure 14:
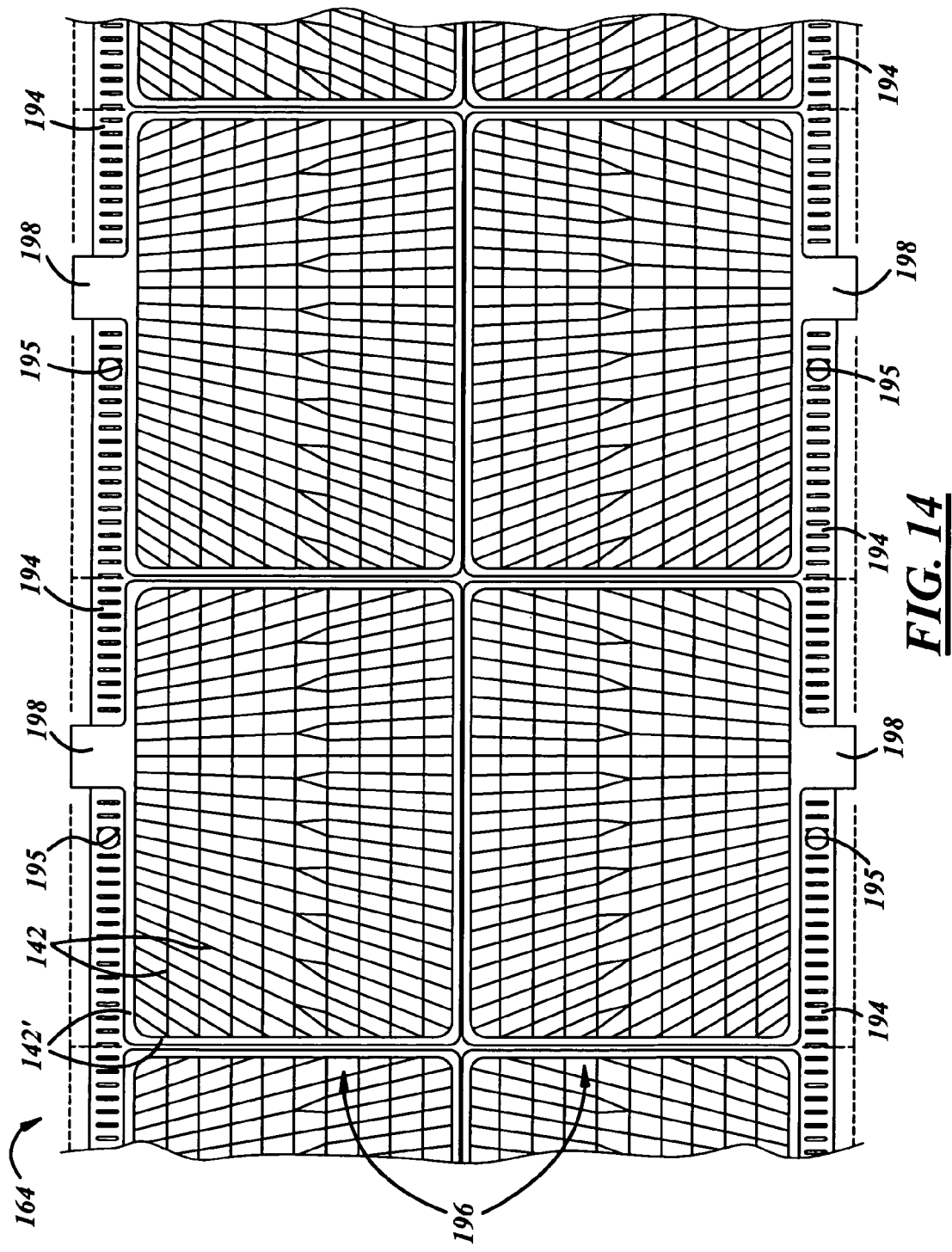
FIG. 14 illustrates an exemplary battery grid strip.
Figure 15:
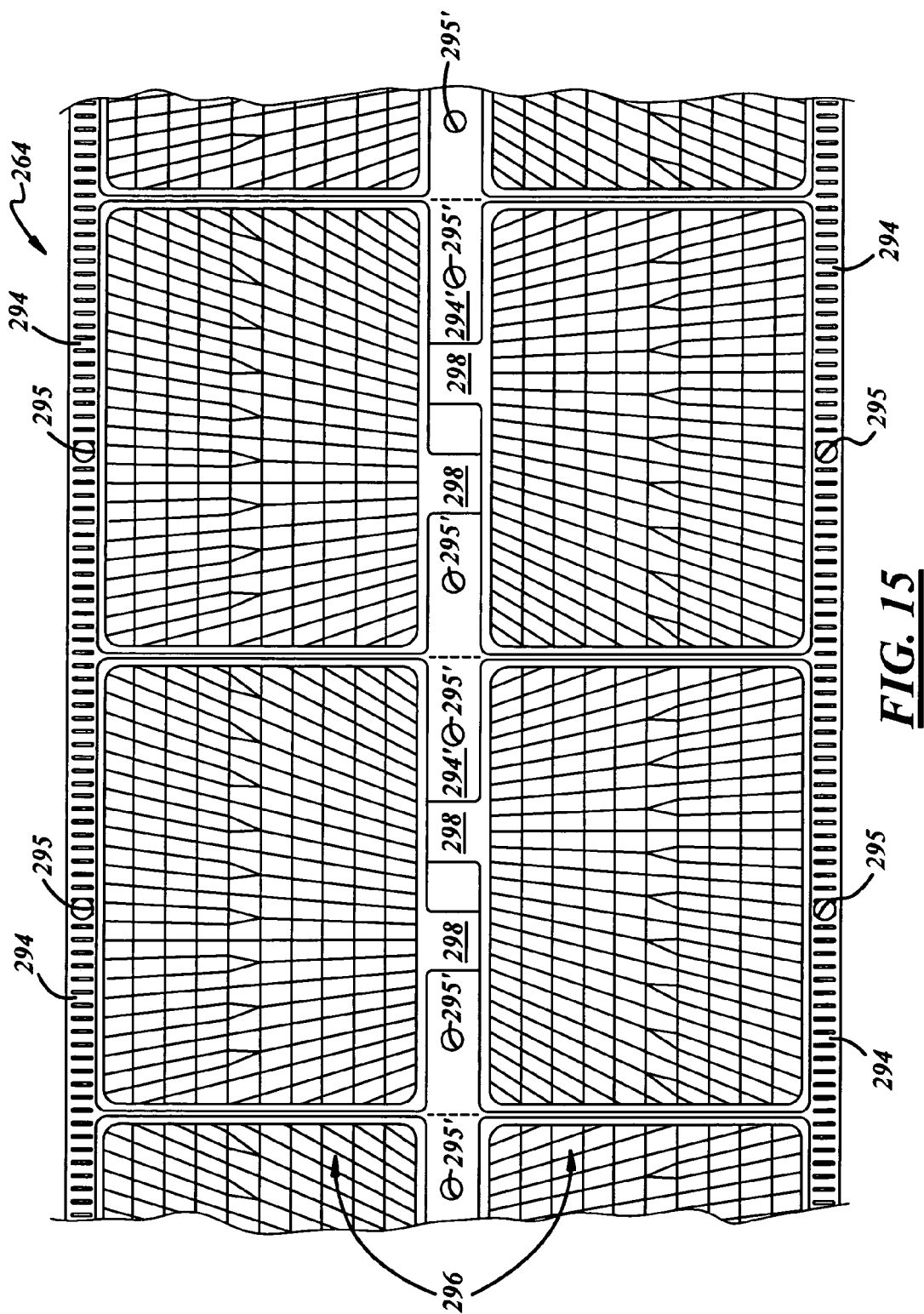
FIG. 15 illustrates another exemplary battery grid strip.

FIGS. 14 and 15 illustrate exemplary grid strips 164, 264. FIG. 14 shows the first exemplary strip 164, which may be continuously cast with a generally solid and continuous section 194 of lead on each side of opposed grids 196 inclusive of lugs 198. The solid sections 194 are sacrificial strips of lead that are cast integrally with the wire segments to provide rigidity and resistance to stretching to enable better control of the length and further processing of the strip 164, and/or individual grids 196 which are relatively thin and light. Similarly, FIG. 15 illustrates the second exemplary strip 264, which may be continuously cast with laterally opposed solid sections 294, and a central solid section 294' of lead generally between opposed grids 296 inclusive of lugs 298.

The solid sections 194, 294, 294' may include cast locating holes 195, 295, 295' as a reference in stretching the strips 164, 264, and/or for use in locating the strips 164, 264 and/or grids 196, 296 in the reforming tooling, which may include cutting or punching tooling features to cut off the solid sections 194, 294, 294' and/or to define the lugs 198, 298. By design, the size and location of the cast locating holes 195, 295, 295' are closely referenced or tied to the size and location of wire segments 142, 242 and frame segments 142', 242' of the respective grids 196, 198. Accordingly, any increase in distance between locating holes 195, 295 of adjacent grids (in the longitudinal direction of the strips) is indicative of stretching of the grids.

The strips 164, 264 may be continuously cast such that the individual grids 196, 296 are initially slightly shorter in length in the direction of the strips than a desired stretched length after the grids 196, 296 have been stretched by the strip driving machine 66. For example, the initial length of the grids out of the continuous casting machine 62 may be about 0.25% to about 2% shorter than the desired stretched length out of the strip driving machine 66.

Referring now to FIG. 16, the strip driving machine 66 drives the strip, and also controls the length of the individual grids to ensure proper registration of the tooling of the grid reforming machine 66 with respect to the grids. More specifically, the strip driving machine 66 may measure the length and/or speed of the as-cast strip 64 and adjusts the speed and/or torque of the drive rollers 72 to control the length of individual grids constituting the strip 64. To this end, the strip driving machine 66 may include a set of drive rollers 72, which may be driven by any suitable variable speed and/or torque drive 74. The machine 66 may further include a roller 76 of a given diameter that is rotated by the moving strip 64 and coupled to an encoder 78 to measure the length and/or speed of the strip 64. Also, the machine 66 may include a light sensor 80 through which the strip 64 passes, wherein a light beam of the light sensor 80 is interrupted by portions of the grids such as the lugs or is allowed to pass through open portions of the grids such as the locating holes.

A controller (not shown) of the machine 66 may be suitable coupled to the roller encoder 78 and light sensor 80, and to the drive 74 for the drive rollers 72. The controller may include any suitable processor(s), memory, interfaces, and software to monitor input signals from the roller encoder 78 and light sensor 80, process the input(s), and produce output signals to the drive 74 to control the speed and/or torque of the drive rollers 72 and thereby control the lengths of the grids on a grid-to-grid basis to a desired dimension within a desired tolerance. Any other suitable approach to stretching the grids may be used such as manually adjusting the length of the grids using a slip clutch device (not shown) coupled to the drive rollers 72 or other similar device to increase or decrease tension in the strip.

Referring again to FIG. 13, the reforming machine 68 includes the reforming tooling 90, 190, 290, and entrance and exit feed rollers 82, 84 upstream and downstream of the tooling 90, 190, 290 to pass the strip 64, 65 through the machine 68. The tooling 90, 190, 290 may locate on any suitable feature(s), such as the locating holes or the lugs, of the individual grids and compress at least some of the grid wires and frames of the grids to reduce the thicknesses, reform the cross-sectional shapes, and/or texture the surfaces thereof.

In one implementation, upon initially feeding a grid strip into the machine 68 an operator may manually align the locating holes of the grid strip to corresponding locating holes in lower portions of the tooling 90, 190, 290. Then the tooling 90, 190, 290 may be jogged such that locating pins of upper portions of the tooling enter the corresponding locating holes in the grid strip and lower portions of the tooling 90, 190, 290. Thereafter, the drive rollers 82, 84 may be engaged to the grid strip and the reforming machine 68 may be activated to reform and advance the grid strip through the machine 68 to the downstream operations. Because the locating holes are cast at the same time as the wire segments, and the entire strip including the wire segments and locating holes are stretched together, the resulting relationship between the wire segments and locating holes can be relied on in the reforming machine 68 to ensure good registration between the wire segments and frame segments of each grid and corresponding features of the reforming tooling 90, 190, 290.

The reforming machine 68 provides suitable press forces to reduce thickness, reshape, and/or resurface a battery grid, wherein the forces may vary from application to application with the size, weight, and composition of the particular battery grid being reformed. But exemplary press forces to reform the battery grids may be on the order of 25 tons or more.

Because the reforming tooling 90, 190, 290 may be closed in a longitudinal direction of strip feeding, the wire segments and frames of the battery grids need not grow in length. Rather, at least portions of the strip and grids are reduced in thickness and increased in width so that the reformed wire segments have substantially similar or the same weight, cross-sectional area, and/or volume as the as-cast wire segments. For example, with reference to FIG. 19, prior art cast battery grids are typically about 0.045-0.055 inches thick. In a contrasting example, and with reference to FIGS. 9 through 12, the exemplary cast and reformed battery grids may be about 0.025-0.045 inches thick.

Therefore, the battery grids or portions thereof may be reduced in thickness by a factor of less than two but preferably by a factor of between about one and two. This range has been found to be desirable and particularly effective in achieving good tensile strength, good reformation of wire segment geometry, and the like. In a specific example, it is preferable to reduce the thickness of at least portions of an exemplary cast battery grid of about 0.051 inches thickness to an exemplary reformed battery grid of about 0.035 inches thickness, for a reduction factor of just less than about 1.5:1.

According to another exemplary form, the wire segments may be reduced in thickness to the same or different degree than the frame segments. For example, both the wire and frame segments may be reduced in thickness by a factor on the order of about 1.5:1, or the wire segments may be reduced in thickness by a factor on the order of about 1.5:1 whereas the frame segments of the same grid may be reduced in thickness on the order of about 1.2:1. Such control over the reforming of the grids allows the grids to be optimized for a good balance of overall strength and in retaining electrochemical paste.

By reforming the continuously cast grid from its exemplary conventional shape shown in FIG. 19 to any of the preferred shapes shown in FIGS. 3 through 12, several changes may be made. By compressing or cold working the grid wire segments to a reduced thickness, increased width, and new shape, the grain structure of the grid may be changed to a more uniform and smaller grain structure, the tensile strength and rigidity increased, and porosity or inclusions reduced. Also, an inscribed circular cross-section of the battery grid wire segments may be increased. Thus, resistance to corrosion and/or resistance to grid growth of the battery grid may be increased for better battery reliability and performance. Also, the wire segment may have increased surface area for better adhesion of lead oxide paste and may have a more advantageous geometry to help hold lead oxide paste more securely to the grid for longer battery life. Further, the surfaces of the wire segments have controlled surface roughness for better adhesion of lead oxide paste to the battery grid for longer battery life.

Finally, referring again to FIG. 13, the take up machine 70 includes a reel 86 onto which the reformed strip 65 is rolled and stored for age hardening. After age hardening, the strip 65 may be unrolled from the reel 86 before being pasted, dried, and cut into individual strips or plates by other downstream equipment (not shown).

Figure 17:
FIG. 17 is a micrograph of a surface of a battery grid wire segment that has been die punched.
Figure 18:
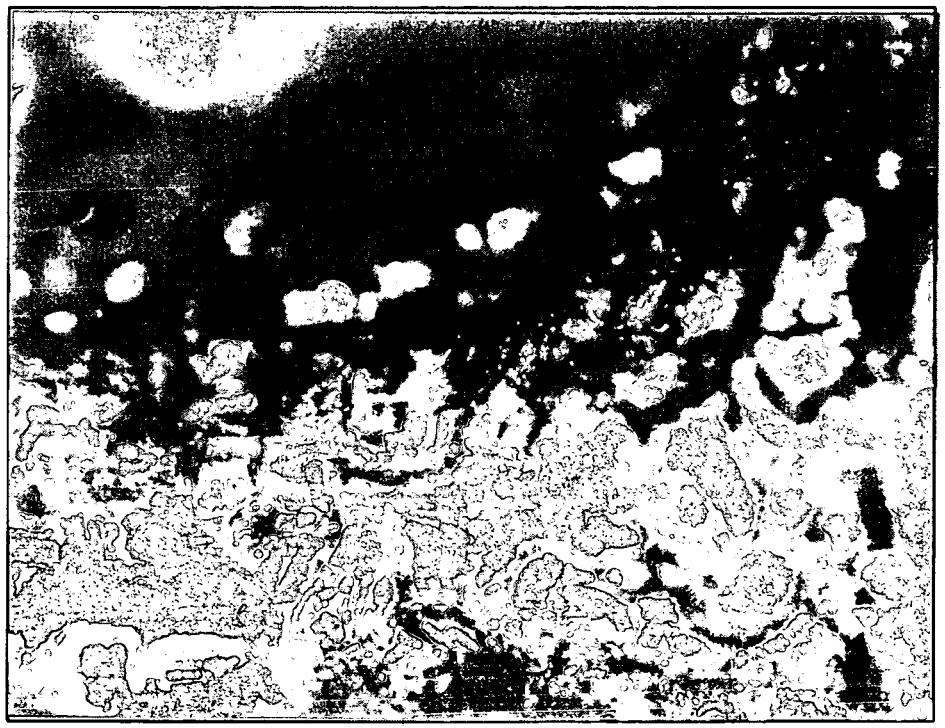
FIG. 18 is a micrograph of the surface of the battery grid wire segment of FIG. 17, after surface texturing has been applied.

FIGS. 17 and 18 illustrate micrographs, at 40× magnification, of grid surfaces before and after surface texturing, respectively. The micrograph of FIG. 17 was taken of a grid at 40× magnification after a die punching operation using a punching die without surface texturing, wherein the grid surface roughness is about 22 microinches Ra. In contrast, the micrograph of FIG. 18 was taken of the die punched grid of FIG. 17 at 40× magnification after a surface texturing operation, wherein the grid surface roughness is about 200 to about 400 microinches Ra.

The invention is described in many different forms, which are similar to one another, and like numerals between the forms generally designate like or corresponding elements throughout the several views of the drawing figures. Additionally, the descriptions of the different forms are incorporated by reference into one another, and descriptions of the common subject matter between the forms generally may not be repeated.

While the forms of the invention herein disclosed constitute exemplary embodiments, many others are possible. It is not intended herein to mention all the possible equivalent forms or ramifications of the invention. The terms used herein are merely descriptive, rather than limiting, and that various changes may be made without departing from the spirit or scope of the invention.

What is claimed is:

1. A method of making a grid for a battery plate for a lead-acid battery, comprising:
   punching a cast or cast and rolled lead alloy solid strip to form a grid strip of the lead alloy having a plurality of connected grids with each grid having a generally planar surface, a plurality of spaced-apart wire segments interconnected at nodes, and a plurality of open spaces between the wire segments;
   stamping the plurality of the wire segments of each grid with a reforming die without removing lead alloy from them, to change the transverse cross-sectional shape of said wire segments of each grid and thereby forming on said wire segments respective land surfaces inclined at an angle which is neither perpendicular nor parallel to the generally planar surface of the grid; and
   forming a controlled surface roughness having a substantially uniform distribution and a size of about 100 micro inches Ra to 900 micro inches Ra on the plurality of the inclined land surfaces of the wire segments of each grid with stamping or rolling dies without removing lead alloy from said wire segments to promote adhesion to said plurality of wire segments of each grid of subsequently applied and cured battery paste.

2. The method of claim 1 wherein the controlled surface roughness is in the range of about 200 micro-inches Ra to 900 micro-inches Ra.

3. The method of claim 1 wherein the controlled surface roughness is in the range of about 200 micro-inches Ra to 600 micro-inches Ra.

4. The method of claim 1 wherein forming the controlled surface roughness further comprises stamping at least four inclined land surfaces on at least some of the wire segments of each grid.

5. The method of claim 1 wherein the controlled surface roughness is formed with stamping dies.

6. The method of claim 1 wherein the controlled surface roughness is formed with rolling dies.

7. The method of claim 1 wherein the stamping of the plurality of the wire segments of each grid further comprises reducing the maximum thickness of at least a portion of at least some of said wire segments.

8. The method of claim 7 wherein the degree of reduction in thickness of said wire segments of each grid is by a factor of 1.2:1 to 2:1.

9. The method of claim 1 wherein the punching of the lead alloy solid strip to form the grid strip further comprises forming a frame of each grid; and wherein the stamping of the plurality of the wire segments of each grid further comprises reducing the thickness of at least one segment of the frame and reducing the thickness of at least some of the wire segments of each grid with the degree of reduction in thickness of said wire segments of each grid being different than the degree of reduction in thickness of said at least one frame segment of each grid.

10. The method of claim 9 wherein the degree of reduction in thickness of said wire segments of each grid is by a factor of about 1.2:1 to 2:1.

11. The method of claim 1 which further comprises forming at least one sacrificial strip extending along and integral with the grid strip and having locating holes through the at least one sacrificial strip and the forming of the controlled surface roughness on the wire segments of each grid is accomplished with the stamping or rolling die being registered with at least one of the locating holes of the sacrificial strip while forming said controlled surface roughness.

12. The method of claim 1 further comprising applying an electrochemically active paste to each grid including said controlled surface roughness of the inclined lands of at least some of the wire segments of each grid to produce a battery plate.

13. A method of making a grid for a battery plate for a lead-acid battery, comprising:
   piercing and pulling a cast or cast and rolled lead alloy solid strip to form a grid strip of the lead alloy having a plurality of connected grids with each grid having a generally planar surface, a plurality of spaced-apart wire segments interconnected at nodes, and a plurality of open spaces between the wire segments;
   stamping the plurality of the wire segments of each grid with a reforming die without removing lead alloy from them, to change the transverse cross-sectional shape of said wire segments of each grid and thereby forming on said wire segments respective land surfaces inclined at an angle which is neither perpendicular nor parallel to the generally planar surface of the grid; and
   forming a controlled surface roughness having a substantially uniform distribution and a size of about 100 micro inches Ra to 900 micro inches Ra on the plurality of the inclined land surfaces of the wire segments of each grid with stamping or rolling dies without removing lead alloy from said wire segments to promote adhesion to said plurality of wire segments of each grid of subsequently applied and cured battery paste.

14. The method of claim 13 wherein the controlled surface roughness is in the range of about 200 micro-inches Ra to 900 micro inches Ra.

15. The method of claim 13 wherein the controlled surface roughness is in the range of about 200 micro-inches Ra to 600 micro-inches Ra.

16. The method of claim 13 wherein forming the controlled surface roughness further comprise stamping at least four inclined land surfaces on at least some of the wire segments of each grid.

17. The method of claim 13 wherein the controlled surface roughness is formed with stamping dies.

18. The method of claim 13 wherein the controlled surface roughness is formed with rolling dies.

19. The method of claim 13 wherein the stamping of the plurality of the wire segments of each grid further comprises reducing the maximum thickness of at least a portion of at least some of said wire segments.

20. The method of claim 19 wherein the degree of reduction in thickness of said wire segments of each grid is by a factor of 1.2:1 to 2:1.

21. The method of claim 13 wherein the punching of the lead alloy solid strip to form the grid strip further comprises forming a frame of each grid; and wherein the stamping of the plurality of the wire segments of each grid further comprises reducing the thickness of at least one segment of the frame and reducing the thickness of at least some of the wire segments of each grid with the degree of reduction in thickness of said wire segments of each grid being different than the degree of reduction in thickness of said at least one frame segment of each grid.

22. The method of claim 21 wherein the degree of reduction in thickness of said wire segments of each grid is by a factor of about 1.2:1 to 2:1.

23. The method of claim 13 which further comprises forming at least one sacrificial strip extending along and integral with the grid strip and having locating holes through said at least one sacrificial strip and the forming of the controlled surface roughness the wire segments of each grid is accomplished with the stamping or rolling die being registered with at least one of the locating holes of the sacrificial strip while forming said controlled surface roughness.

24. The method of claim 13 further comprising applying an electrochemically active paste to each grid including said surface roughness of the inclined lands of at least some of the wire segments of each grid to produce a battery plate.

25. A method of making a grid for a battery plate for a lead-acid battery, comprising:
   continuous casting a molten lead alloy to form a grid strip of the lead alloy having a plurality of connected grids with each grid having a generally planar surface, a plurality of spaced-apart wire segments interconnected at nodes, and a plurality of open spaces between the wire segments;
   stamping the plurality of the wire segments of each grid with a reforming die without removing lead alloy from them, to change the transverse cross-sectional shape of said wire segments of each grid and thereby forming on said wire segments respective land surfaces inclined at an angle which is neither perpendicular nor parallel to the generally planar surface of the grid; and
   forming a controlled surface roughness having a substantially uniform distribution and a size of about 100 micro-inches Ra to 900 micro-inches Ra on the plurality of the inclined land surfaces of the wire segments of each grid with stamping or rolling dies without removing lead alloy from said wire segments to promote adhesion to said plurality of wire segments of each grid of subsequently applied and cured battery paste.

26. The method of claim 25 wherein the controlled surface roughness is in the range of about 200 micro-inches Ra to 900 micro inches Ra.

27. The method of claim 25 wherein the controlled surface roughness is in the range of about 200 micro-inches Ra to 600 micro-inches Ra.

28. The method of claim 25 wherein forming the controlled surface roughness further comprises stamping at least four inclined land surfaces on at least some of the wire segments of each grid.

29. The method of claim 25 wherein the controlled surface roughness is formed with stamping dies.

30. The method of claim 25 wherein the controlled surface roughness is formed with rolling dies.

31. The method of claim 25 wherein the stamping of the plurality of the wire segments of each grid further comprises reducing the maximum thickness of at least a portion of at least some of said wire segments.

32. The method of claim 25 wherein the degree of reduction in thickness of said wire segments of each grid is by a factor of 1.2:1 to 2:1.

33. The method of claim 25 wherein the punching of the lead alloy solid strip to form the grid strip further comprises forming a frame of each grid; and wherein the stamping of the plurality of the wire segments of each grid further comprises reducing the thickness of at least one segment of the frame and reducing the thickness of at least some of the wire segments of each grid with the degree of reduction in thickness of said wire segments of each grid being different than the degree of reduction in thickness of said at least one frame segment of each grid.

34. The method of claim 25 wherein the degree of reduction in thickness of said wire segments of each grid is by a factor of about 1.2:1 to 2:1.

35. The method of claim 25 which further comprises forming at least one sacrificial strip extending along and integral with the grid strip and having locating holes through said at least one sacrificial strip and the forming of the controlled surface roughness on the wire segments of each grid is accomplished with the stamping or rolling die being registered with at least one of the locating holes of the sacrificial strip while forming said controlled surface roughness.

36. The method of claim 25 further comprising applying an electrochemically active paste to each grid including said surface roughness of the inclined lands of at least some of the wire segments of each grid to produce a battery plate.

\* \* \* \* \*

UNITED STATES PATENT AND TRADEMARK OFFICE
CERTIFICATE OF CORRECTION

| | | |
|---|---|---|
| PATENT NO. | : 8,875,361 B2 | Page 1 of 1 |
| APPLICATION NO. | : 12/124478 | |
| DATED | : November 4, 2014 | |
| INVENTOR(S) | : Wirtz et al. | |

It is certified that error appears in the above-identified patent and that said Letters Patent is hereby corrected as shown below:

In the claims

Col. 12 line 47, Claim 16, delete "comprise" and insert -- comprises --.

Col. 14 line 19, Claim 33, delete "punching" and insert -- continuous casting --.

Signed and Sealed this
Sixth Day of October, 2015

Michelle K. Lee
*Director of the United States Patent and Trademark Office*